US008817869B2

(12) United States Patent
Kubo et al.

(10) Patent No.: US 8,817,869 B2
(45) Date of Patent: Aug. 26, 2014

(54) IMAGE PROCESSING DEVICE AND METHOD, AND IMAGE DISPLAY DEVICE AND METHOD

(75) Inventors: Toshiaki Kubo, Tokyo (JP); Yoshiki Ono, Tokyo (JP); Naoyuki Fujiyama, Tokyo (JP); Tomoatsu Horibe, Tokyo (JP); Osamu Nasu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 544 days.

(21) Appl. No.: 13/226,542

(22) Filed: Sep. 7, 2011

(65) Prior Publication Data

US 2012/0093225 A1    Apr. 19, 2012

(30) Foreign Application Priority Data

Oct. 18, 2010   (JP) .................... 2010-233502

(51) Int. Cl.
*H04N 7/26* (2006.01)
*H04N 7/46* (2006.01)
*G06K 9/00* (2006.01)

(52) U.S. Cl.
CPC ........... *H04N 7/467* (2013.01); *H04N 7/26888* (2013.01); *H04N 7/26797* (2013.01)
USPC .......................................... 375/240; 382/107

(58) Field of Classification Search
USPC ....................................................... 375/240
See application file for complete search history.

(56) References Cited

U.S. PATENT DOCUMENTS

| | | | |
|---|---|---|---|
| 6,219,436 B1 * | 4/2001 | De Haan et al. | 382/107 |
| 6,337,917 B1 * | 1/2002 | Onural et al. | 382/107 |
| 6,487,313 B1 | 11/2002 | De Haan et al. | |
| 6,757,328 B1 * | 6/2004 | Huang et al. | 375/240.1 |
| 7,586,540 B2 * | 9/2009 | Ogino et al. | 348/448 |
| 8,149,913 B2 * | 4/2012 | Ishii | 375/240.16 |
| 8,184,200 B1 * | 5/2012 | Biswas et al. | 348/459 |
| 2003/0174777 A1 | 9/2003 | Itoh et al. | |
| 2004/0246374 A1 | 12/2004 | Mishima et al. | |
| 2005/0129124 A1 | 6/2005 | Ha | |
| 2005/0157792 A1 | 7/2005 | Baba et al. | |
| 2008/0069221 A1 | 3/2008 | Ohwaki et al. | |
| 2008/0317127 A1 * | 12/2008 | Lee et al. | 375/240.16 |

(Continued)

FOREIGN PATENT DOCUMENTS

| | | | |
|---|---|---|---|
| JP | 2000-125305 A | 4/2000 | |
| JP | 2001-507552 A | 6/2001 | |

(Continued)

*Primary Examiner* — Sath V Perungavoor
*Assistant Examiner* — Howard D Brown, Jr.
(74) *Attorney, Agent, or Firm* — Birch, Stewart, Kolasch & Birch, LLP

(57) ABSTRACT

To interpolate a frame between the current frame and a first delayed frame preceding the current frame, an image processing device generates test interpolation data for the first delayed frame from data in point-symmetric positions in the current frame and in a second delayed frame preceding the first delayed frame. Motion vectors pointing from the first delayed frame to the current frame are found by evaluating different test interpolation data against the actual data of the first delayed frame. These motion vectors are converted to pairs of motion vectors pointing from the first delayed frame and the current frame to the interpolated frame, and these pairs of motion vectors are used to detect occlusion and generate accurate data for the interpolated frame from the data of the first delayed frame and the current frame, excluding occluded data.

18 Claims, 10 Drawing Sheets

(56) References Cited

U.S. PATENT DOCUMENTS

| | | | |
|---|---|---|---|
| 2009/0016623 A1* | 1/2009 | Higewake | 382/236 |
| 2010/0080299 A1 | 4/2010 | Takeda et al. | |
| 2012/0093225 A1* | 4/2012 | Kubo et al. | 375/240.16 |
| 2013/0176447 A1* | 7/2013 | Nakashima | 348/208.4 |

FOREIGN PATENT DOCUMENTS

| | | |
|---|---|---|
| JP | 2002-523985 A | 7/2002 |
| JP | 2003-274414 A | 9/2003 |
| JP | 2004-128702 A | 4/2004 |
| JP | 2004-297719 A | 10/2004 |
| JP | 2005-176381 A | 6/2005 |
| JP | 2005-204066 A | 7/2005 |
| JP | 2006-332950 A | 12/2006 |
| JP | 2008-78818 A | 4/2008 |
| JP | 4220284 B2 | 2/2009 |
| JP | 4244685 B2 | 3/2009 |
| JP | 4359223 B2 | 11/2009 |
| JP | 2010-28478 A | 2/2010 |
| JP | 2010-87867 A | 4/2010 |

* cited by examiner

2ND DELAYED FRAME F2　　1ST DELAYED FRAME F1　　CURRENT FRAME F0

1ST DELAYED FRAME F1    INTERPOLATED FRAME IF    CURRENT FRAME F0

IMAGE PROCESSING DEVICE AND METHOD, AND IMAGE DISPLAY DEVICE AND METHOD

BACKGROUND OF THE INVENTION

1. Field of the Invention

The present invention relates to an image processing device and method and an image display device and method, and more particularly to a frame interpolation process that interpolates new image frames between existing image frames.

2. Description of the Related Art

Liquid crystal displays and other displays of the hold type display the same image continuously for one frame period. A consequent problem is that the edges of moving objects in the image appear blurred, because although the human eye moves continuously while following a moving object, the moving object moves discontinuously, one frame at a time. One possible countermeasure is to smooth out the motion of the object by interpolating frames, thereby increasing the number of displayed frames.

A related problem, referred to as judder, occurs in content created by converting filmed footage such as a movie to a television signal. Because of the different frame rates of the two (the filmed footage and the television signal), two or three frames in the resulting image signal may have been created from the same original frame. If the image signal is displayed as is, motion appears blurred or jerky.

Judder also occurs when computer-processed video is converted to a television signal without further change, because two frames of the resulting television picture are generated from the same computer-processed frame.

In conventional image processing devices and methods, one finds the zero-order hold method, which interpolates an image identical to the preceding frame, and the mean value method, in which the interpolated frame is the average of the preceding and following frames. The zero-order hold method, however, fails to produce smooth motion in an image that moves in a fixed direction, leaving the problem of blur in hold-type displays unsolved. With the mean value interpolation method, there is the problem that moving objects acquire ghosts.

A remedy proposed in U.S. Pat. No. 7,586,540 and corresponding Japanese Patent Application Publication No. 2006-129181 (p. 8, FIG. 3, now Japanese Patent No. 4359223) generates each interpolated pixel in the interpolated frame from the most highly correlated pair of pixels in the preceding and following frames that are in point-symmetric positions with the interpolated pixel as the center of symmetry. Since this method detects correlation between individual pixels, however, a large correlation between pixels in areas of quite different image content is sometimes detected, in which case a correctly interpolated frame cannot be generated.

Conventional frame interpolation processing as described above is plagued by the problems of blurred or jerky motion (judder) and the interpolation of incorrect frames due to false correlation detection. The disruption of interpolated frames becomes particularly evident when an image element appears and disappears in the preceding and following frames.

SUMMARY OF THE INVENTION

According to one aspect of the invention, there is provided an image processing device for inserting a newly interpolated frame between data of a current frame of an image and data of a first delayed frame one frame before the current frame, comprising:

a motion vector detector for calculating, for each of a plurality of blocks consisting of a plurality of pixels within the first delayed frame, a first motion vector from the first delayed frame to the current frame, on a basis of the data of the current frame, the data of the first delayed frame, and data of a second delayed frame two frames before the current frame;

a motion vector converter for converting the first motion vector to a second motion vector from the first delayed frame to the interpolated frame and a third motion vector from the current frame to the interpolated frame by apportioning the first motion vector among the second and third motion vectors;

an occlusion area estimator for detecting occlusion areas in which the interpolated frame lacks pixels corresponding to pixels present in the first delayed frame according to the second motion vector or pixels corresponding to pixels present in the current frame according to the third motion vector, each occlusion area consisting of an area of sharp change between mutually adjacent second motion vectors or mutually adjacent third motion vectors, and an area peripheral to the area of sharp change, and outputting, on a basis of information about the occlusion areas, a fourth motion vector based on information indicating presence or absence of pixels according to the second motion vector and a fifth motion vector based on information indicating presence or absence of pixels according to the third motion vector; and an interpolated frame generator for generating data for the interpolated frame from the fourth motion vector, the fifth motion vector, the data of the first delayed frame, and the data of the current frame, and outputting image data in which the data of the interpolated frame are inserted between the data of the current frame and the data of the first delayed frame.

The motion vector detector may include:

a test interpolator for generating a plurality of test interpolation data from at least one of the data of the second delayed frame and the data of the current frame, an interpolation data evaluator for evaluating strength of correlation of the plurality of test interpolation data on a basis of the data of the first delayed frame and outputting a plurality of evaluation data; and a motion vector determiner for generating the first motion vector on a basis of the evaluation data having a strongest correlation among the plurality of evaluation data.

According to the invention, it is possible to interpolate frames without disruption in occlusion areas. Moreover, motion vectors can be calculated accurately without image disruption.

DETAILED DESCRIPTION OF THE INVENTION

An embodiment of the invention will now be described with reference to the attached drawings.

The image processing device in the embodiment interpolates the data of a newly interpolated frame IF between the data of the current frame F0 and the data of the frame F1 one frame before the current frame F0, also referred to below as the first delayed frame. The image display device in the embodiment includes an image display unit that displays the image data output from the image processing device.

Figure 1:
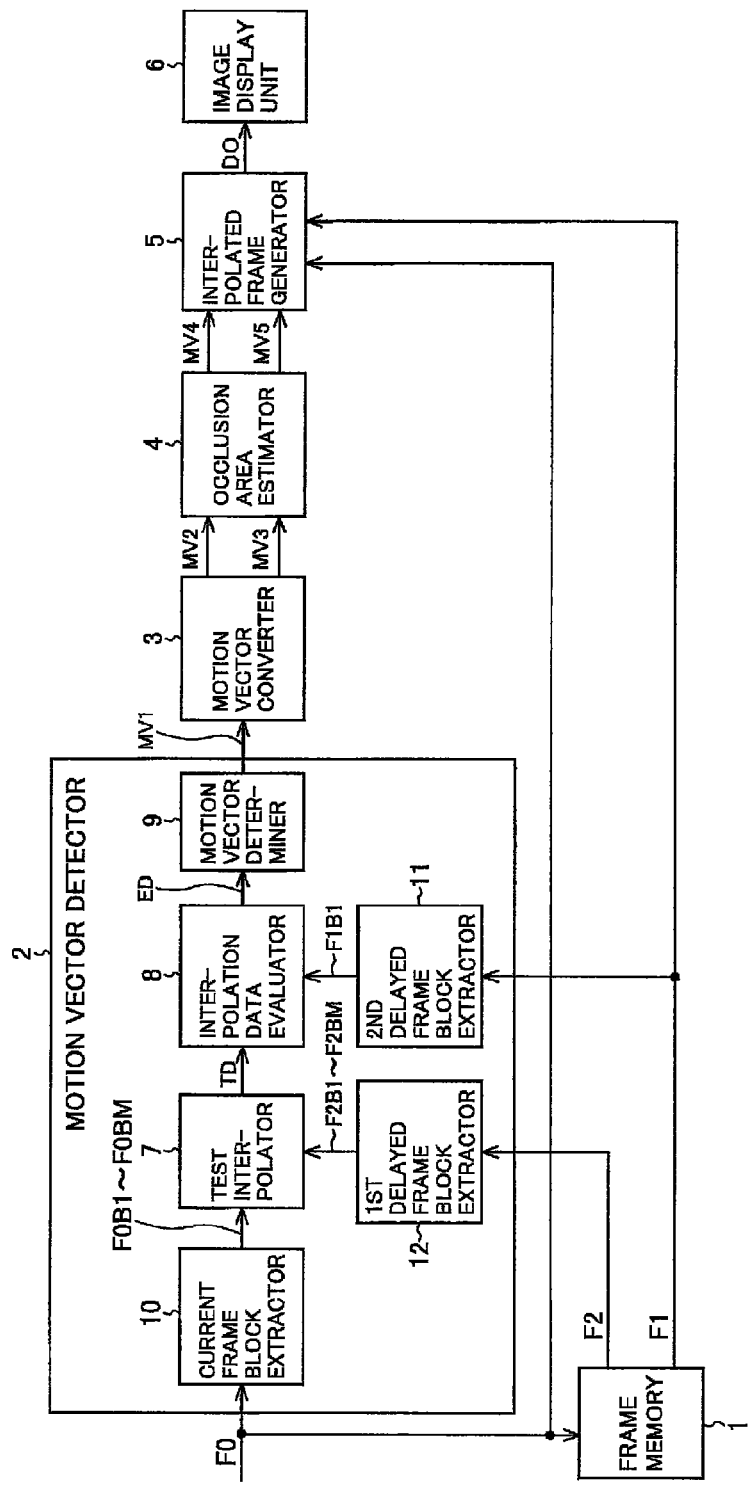
FIG. 1 is a block diagram showing the structure of an image display device according to an embodiment of the invention.

Referring to FIG. 1, the image display device includes a frame memory 1, a motion vector detector 2, a motion vector converter 3, an occlusion area estimator 4, an interpolated frame generator 5, and an image display unit 6.

Image data F0 are input to the frame memory 1, motion vector detector 2, and interpolated frame generator 5.

The frame memory 1 stores two frames of image data F0 and outputs image data F1, generated by delaying image data F0 by one frame, and image data F2, generated by delaying image data F0 by two frames. Image data F0, image data F1, and image data F2 will also be referred to as, respectively, the data of the current frame, the data of the first delayed frame, and the data of the second delayed frame. The same reference characters F0, F1, and F2 will also be used to denote, respectively, the current frame, the first delayed frame, and the second delayed frame.

The data of the first delayed frame F1 are input to the motion vector detector 2 and the interpolated frame generator 5, and the data of the second delayed frame F2 are input to the motion vector detector 2.

The motion vector detector 2 reads the data of the current frame F0, the data of the first delayed frame F1, and the data of the second delayed frame F2, calculates a first motion vector MV1 from the first delayed frame F1 to the current frame F0 for each block (constituting part of a frame and consisting of a plurality of pixels in the first delayed frame F1, and outputs the calculated first motion vector MV1 to the motion vector converter 3.

The motion vector converter 3 converts the first motion vector MV1 to a second motion vector MV2 from the first delayed frame F1 to the interpolated frame IF and a third motion vector MV3 from the current frame F0 to the interpolated frame IF, and outputs the second and third motion vectors MV2, MV3 to the occlusion area estimator 4.

The occlusion area estimator 4 estimates occlusion areas (OC) from the second and third motion vectors MV2, MV3, modifies the second and third motion vectors MV2, MV3 on the basis of information about the estimated occlusion area, and outputs fourth and fifth motion vectors MV4, MV5 to the interpolated frame generator 5.

An occlusion area means an area in which a block (therefore, the pixels constituting the block) corresponding to a block (therefore, the pixels constituting the block) that is present in some frame, for example, the frame before or after an interpolated frame, is not present in the interpolated frame, and its peripheral area. For example, when an element of an image (an element corresponding to an imaged object, for example) disappears behind or appears from behind another element of the image, the boundary area between these elements is an occlusion area.

For example, the occlusion area estimator 4 infers that an area in which the second and third motion vectors MV2, MV3 change sharply, and its peripheral area, is an occlusion area.

Whether a motion vector changes sharply is determined by, for example, whether a change in motion vector between adjacent blocks is equal to or greater than a predetermined value. That is, when motion vectors are obtained per block as described in this embodiment, each block consisting of a plurality of pixels, if the motion vectors of two mutually adjacent blocks differ by a predetermined value or more, an edge is deemed to exist between these two blocks.

The interpolated frame generator 5 generates data for the interpolated frame IF positioned between the current frame F0 and the first delayed frame F1, from the data of the first delayed frame F1, the data of the current frame F0, the fourth motion vector MV4, and the fifth motion vector MV5, and outputs, to the image display unit 6, image data DO in which the generated data of the interpolated frame IF are inserted between the data of the current frame F0 and the data of the first delayed frame F1.

The image display unit 6 displays the image data DO.

Next, the structure of the motion vector detector 2 will be described in detail.

The motion vector detector 2 has a motion vector determiner 9, a current frame block extractor 10, a first delayed frame block extractor 11, a second delayed frame block extractor 12, a test interpolator 7, and an interpolation data evaluator 8.

The current frame block extractor 10, the first delayed frame block extractor 11, and the second delayed frame block extractor 12 each extract a block forming a part of a screen and output a set of pixel data (pixel values) within the block as block data. Each block forms a rectangular area having a size of, for example, X pixels in the horizontal direction and Y pixels (Y lines) in the vertical direction. That is, the block extracted from the current frame F0, the block extracted from the first delayed frame F1, and the block extracted from the second delayed frame F2 are mutually equal in size (in number of pixels) in the horizontal direction and size (number of pixels or number of lines) in the vertical direction.

The current frame block extractor 10 extracts blocks from the current frame F0, the first delayed frame block extractor 11 extracts blocks from the first delayed frame F1, and the second delayed frame block extractor 12 extracts blocks from the second delayed frame F2.

The process performed to generate one block in the interpolated frame IF by interpolation will be described below. The following blocks are extracted for this process: one block in the first delayed frame F1 corresponding to the block to be interpolated in the interpolated frame IF; a plurality of blocks in the current frame F0; and a plurality of blocks in the second delayed frame F2. The blocks extracted from the current frame F0 and the blocks extracted from the second delayed frame F2 are in point-symmetric positions with respect to the block (more precisely, the center position of the block) in the first delayed frame F1, which is taken as the center of symmetry, and are used as pairs. That is, the current frame block extractor 10 and the second delayed frame block extractor 12 extract a plurality of pairs of blocks centered on the block in the first delayed frame F1, where in each pair, one block is disposed in the current frame F0 and the other block is disposed in the second delayed frame F2.

The pairs of blocks extracted from the current frame F0 and second delayed frame F2 correspond to motion vector candidates detected in the motion vector detector 2, and for example, all blocks within a motion vector search area are extracted. When an area centered on the center position of the block in the first delayed frame F1, measuring ±HS pixels in the horizontal direction and ±VS pixels (±VS lines) in the vertical direction, is searched, for example, (2HS+1)×(2VS+1) blocks are extracted from each of the second delayed frame F2 and the current frame F0.

When all blocks in the search area do not have to be evaluated, for example, when the range of direction of the motion is predictable in advance or from other information, only the blocks in the predicted range within the search area may be extracted. Alternatively, a sparse set of blocks in the search area (centered, for example, at every other pixel in the horizontal and vertical directions) may be extracted.

The number of blocks extracted from the current frame F0 and the second delayed frame F2 is assumed to be M below: the first to M-th blocks extracted from the current frame F0 are denoted F0B1 to F0BM; the first to M-th blocks extracted from the second delayed frame F2 are denoted F2B1 to F2BM. The data of each block are indicated by the same reference character as used for the block.

The m-th block F2Bm (m=1 to M) in the second delayed frame F2 and the m-th block F0Bm in the current frame F0 are in point-symmetric positions with the block F1B1 (more precisely, the pixel at the center of that block) in the first delayed frame F1 taken as the center of symmetry. Therefore, if block F2Bm is shifted with respect to block F1B1 by h horizontally (h=−HS to +HS) and v vertically (v=−VS to +VS), block F0Bm shifts by −h horizontally and −v vertically with respect to block F1B1.

The current frame block extractor 10 extracts a plurality of blocks, i.e., first to M-th blocks, from the current frame and outputs first to M-th block data F0B1 to F0BM.

The first delayed frame block extractor 11 extracts block F1B1 from the first delayed frame. Block F1B1 corresponds to the block to be interpolated in the interpolated frame IF.

The second delayed frame block extractor 12 extracts a plurality of blocks, i.e., first to M-th blocks, from the second delayed frame and outputs first to M-th block data F2B1 to F2BM.

The block data of the current frame F0 and the block data of the second delayed frame F2 are input to the test interpolator 7. The test interpolator 7 generates test interpolation data from the block data of the second delayed frame F2 and the block data of the current frame F0 on the basis of block pairs consisting of a block in the second delayed frame F2 and a block in the current frame F0 that are in point-symmetric positions with block F1B1 in the first delayed frame F1 taken as the center of symmetry. A plurality of test interpolation data are generated on the basis of a plurality of block pairs. This test interpolation is performed on the assumption that the data at the center position of the point-symmetry, that is, the data of block F1B1 in the first delayed frame F1, are unknown, so that as the accuracy of interpolation increases, the test interpolation data have a higher correlation with the data of the block F1B1.

The interpolation data evaluator 8 refers to the block data of the first delayed frame F1 to evaluate the plurality of test interpolation data and outputs evaluation data ED to the motion vector determiner 9. In this evaluation, a correlation between the test interpolation data and the block data of the first delayed frame F1 is obtained and a higher evaluation is given to a higher correlation.

The motion vector determiner 9 generates and outputs the first motion vector MV1 according to the evaluation data ED.

Figure 2:
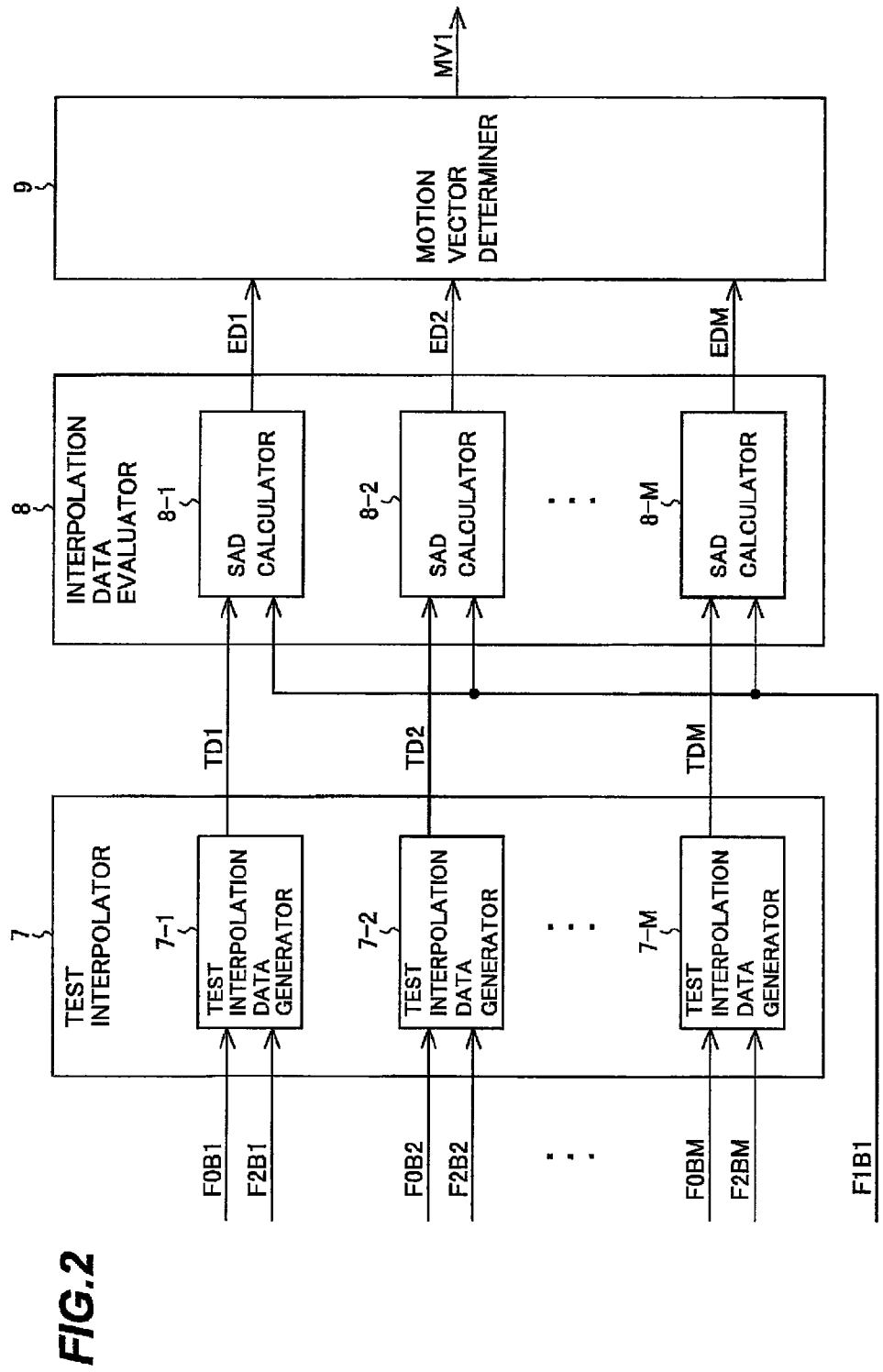
FIG. 2 is a block diagram showing a specific example of the test interpolator, interpolation data evaluator, and motion vector determiner in the motion vector detector in FIG. 1.

Next, a specific example of the test interpolator 7, interpolation data evaluator 8, and motion vector determiner 9 in the motion vector detector 2 will be described in detail with reference to FIG. 2.

The test interpolator 7 is depicted as having a plurality of test interpolation data generators, i.e., first to M-th test interpolation data generators 7-1 to 7-M. The interpolation data evaluator 8 is depicted as having a plurality of sum-of-absolute-differences (SAD) calculators, i.e., first to M-th SAD calculators 8-1 to 8-M.

The test interpolation data generators 7-i to 7-M calculate, as test interpolation data TD1 to TDM, the data of average values obtained by averaging the block data F0B1 to F0BM of the current frame F0 and the respective paired block data F2B1 to F2BM of the second delayed frame F2 on a per-pixel basis. In FIG. 1, the set of test interpolation data TD1 to TDM is indicated by reference characters TD.

A more detailed description will now be given.

The first block data F0B1 of the current frame F0 and the first block data F2B1 of the second delayed frame F2 are input to the test interpolation data generator 7-1.

As the first test interpolation data TD1, the test interpolation data generator 7-1 outputs to the SAD calculator 8-1 the per-pixel average values of the first block data F0B1 of the current frame F0 and the first block data F2B1 of the second delayed frame F2. Per-pixel average means, herein, the average of the value of a pixel in a block in the current frame F0 and the value of the pixel at the corresponding position in a block in the second delayed frame (for example, the value of the pixel represented by the same coordinate values referenced to a reference position such as, for example, the upper-left corner of each of the blocks as an origin position).

Similarly, the second block data F0B2 of the current frame F0 and the second block data F2B2 of the second delayed frame F2 are input to the test interpolation data generator 7-2. The test interpolation data generator 7-2 outputs the per-pixel average values of the second block data F0B2 of the current frame F0 and the second block data F2B2 of the second delayed frame F2 to the SAD calculator 8-2 as the second test interpolation data TD2.

The test interpolation data generators 7-3 to 7-M similarly generate, and output to the SAD calculators 8-3 to 8-M, third test interpolation data TD3 to M-th test interpolation data TDM on the basis of the third block data F0B3 to the M-th block data F0BM of the current frame F0 and the third block data F2B3 to the M-th block data F2BM of the second delayed frame F2.

To generalize, the test interpolation data generator 7-$m$ generates the m-th test interpolation data TDm on the basis of the m-th block data F0Bm of the current frame F0 and the m-th block data F2Bm of the second delayed frame F2 and outputs the m-th test interpolation data TDm to the SAD calculator 8-$m$ (m=1 to M).

The block data F1B1 of the first delayed frame F1 are input to the SAD calculators 8-1 to 8-M in the interpolation data evaluator 8.

The SAD calculators 8-1 to 8-M calculate a sum of absolute differences between each of the test interpolation data TD1 to TDM output from the test interpolator 7 and the block data F1B1 of the first delayed frame F1, and output the results as evaluation data ED1 to EDM.

The SAD calculator 8-1 calculates the sum of the absolute values of the differences between the data of each pixel constituting the first test interpolation data TD1 and the data of each pixel constituting the block data F1B1 of the first delayed frame F1, and outputs the result to the motion vector determiner 9 as evaluation data ED1. The sum of absolute differences is expressed by the following equation (1).

$$SAD = \sum_{y=0}^{Y-1} \sum_{x=0}^{X-1} |BK1(x, y) - BK2(x, y)| \tag{1}$$

The smaller the value of the sum of absolute differences given by equation (1) is, the higher the correlation is, so that when the sum of absolute differences SAD is used as evaluation data, smaller values indicates higher evaluations.

In the above equation (1), BK1 and BK2 indicate the data of the pixels in the blocks: BK1 indicates the data of the pixels constituting test interpolation data TD1; BK2 indicates the data of the pixels in block F1B1. Therefore, equation (1) gives the sum of absolute differences between the data of the pixels constituting the first test interpolation data TD1 and the data of the pixels constituting the block data F1B1 of the first delayed frame F1. This sum of absolute differences SAD is output from the SAD calculator 8-1 as evaluation data ED1.

Similarly, the SAD calculators 8-2 to 8-M calculate the sum of absolute differences between the second test interpolation data TD2 to the M-th test interpolation data TDM and the block data F1B1 of the first delayed frame F1, and output the results to the motion vector determiner 9 as evaluation data ED2 to EDM.

The motion vector determiner 9 determines a block pair corresponding to the evaluation data having the highest evaluation (the smallest sum of absolute differences) among the evaluation data ED1 to EDM, and outputs, as motion vector MV1, one-half the location difference between a block in the current frame F0 and a block in the second delayed frame F2 constituting the determined block pair (one-half the relative position of the block in the current frame F0 with respect to the paired block in the second delayed frame F2).

Figure 3:
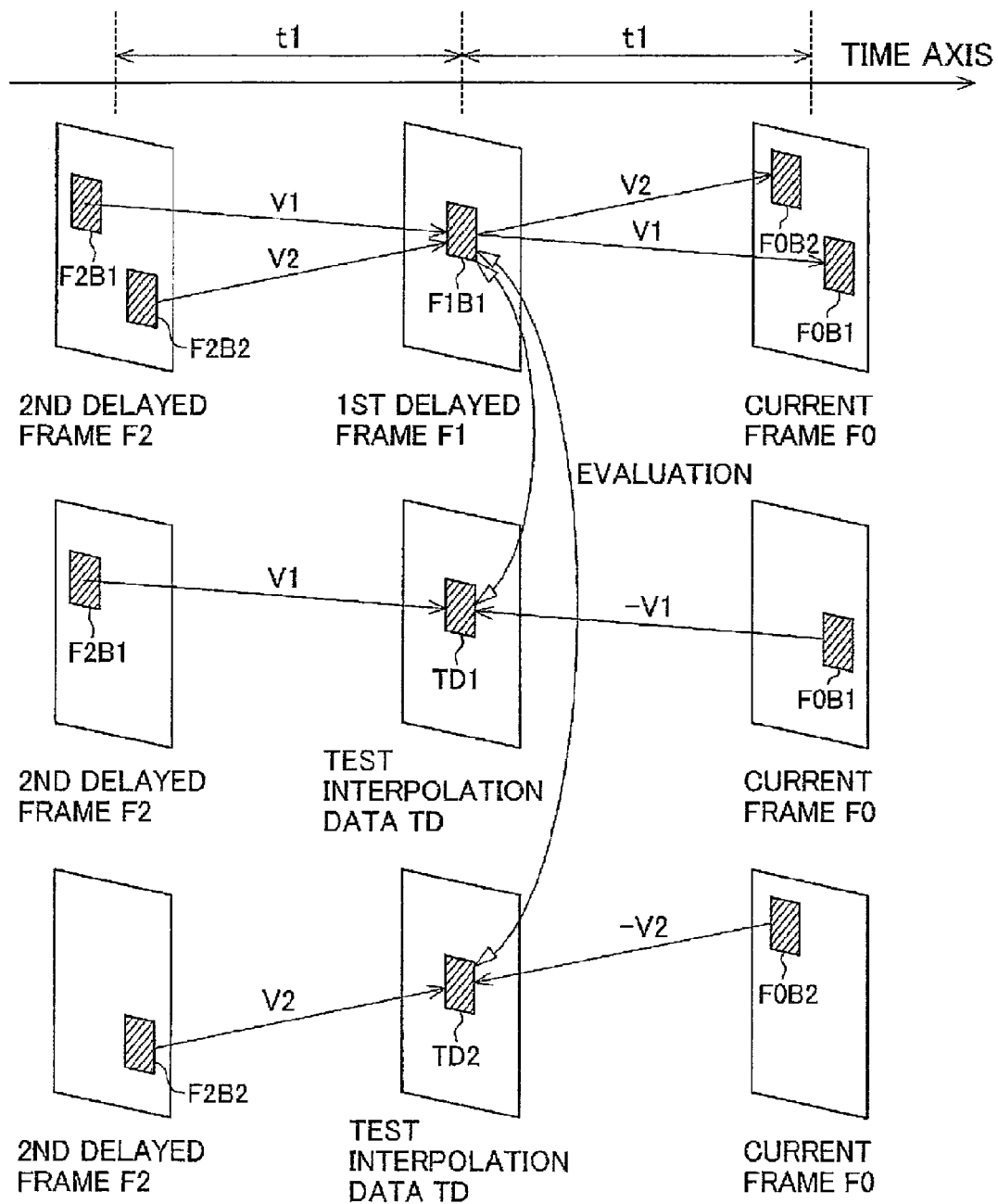
FIG. 3 illustrates the operation of the motion vector detector in FIG. 1.

FIG. 3 is a diagram illustrating the operation of the motion vector detector 2 when M=2.

A region forming a part of the first delayed frame F1 is extracted as the block data F1B1 of the first delayed frame F1.

A region, within the second delayed frame F2, corresponding to a position shifted by a vector −V1 with respect to the block data F1B1 of the first delayed frame F1 is set and extracted as the first block data F2B1 of the second delayed frame F2, and a region, within the current frame F0, corresponding to the position shifted by the vector +V1 with respect to the block data F1B1 of the first delayed frame F1 is set and extracted as the first block data F0B1 of the current frame F0.

A region, within the second delayed frame F2, corresponding to a position shifted by a vector −V2 with respect to the block data F1B1 of the first delayed frame F1 is set and extracted as the second block data F2B2 of the second delayed frame F2, and a region, within the current frame F0, corresponding to the position shifted by the vector +V2 with respect to the block data F1B1 of the first delayed frame F1 is set and extracted as the second block data F0B2 of the current frame F0.

The test interpolation data generator 7-1 generates test interpolation data TD1 by averaging the first block data F0B1 of the current frame F0 and the first block data F2B1 of the second delayed frame F2 on a per-pixel basis.

Similarly, the test interpolation data generator 7-2 generates test interpolation data TD2 by averaging the second block data F0B2 of the current frame F0 and the second block data F2B2 of the second delayed frame F2 on a per-pixel basis.

The SAD calculator 8-1 calculates the sum of absolute differences SAD from test interpolation data TD1 and the block data F1B1 of the first delayed frame F1 by using equation (1) and outputs the result as evaluation data ED1.

Similarly, the SAD calculator 8-2 calculates the sum of absolute differences SAD from test interpolation data TD2 and the block data F1B1 of the first delayed frame F1 by using equation (1) and outputs the result as evaluation data ED2.

As the motion vector MV1, the motion vector determiner 9 outputs the shift (+V1 or +V2) between the blocks forming the block pair that generates the smaller of the evaluation data ED1 and ED2. If evaluation data ED1 is smaller than evaluation data ED2, for example, vector V1 is output as motion vector MV1.

A method of determining the first motion vector from two vectors has been described in FIG. 3, but the structure of this embodiment of the invention is not limited to M=2. That is, three or more vectors may be set as candidates. For example, test interpolation may be performed for all blocks in the second delayed frame that are located in a search area corresponding to a predetermined amount of motion with respect to the block F1B1 in the first delayed frame, and for the blocks in the current frame that are located at point-symmetric positions thereto.

Because the motion vector detector 2 determines the motion vector by evaluating the vector candidates by using the actual data in the first delayed frame F1 as described above, it is possible to accurately calculate a motion vector from the current frame F0 to the first delayed frame F1.

The sum of absolute differences was used to calculate the evaluation data in the interpolation data evaluator 8, but it can be replaced with one of many other available correlation calculation functions, such as, for example, the sum of the squared error.

Next, the operation of the motion vector converter 3 will be described in detail with reference to FIGS. 4A and 4B.

Figure 4A:
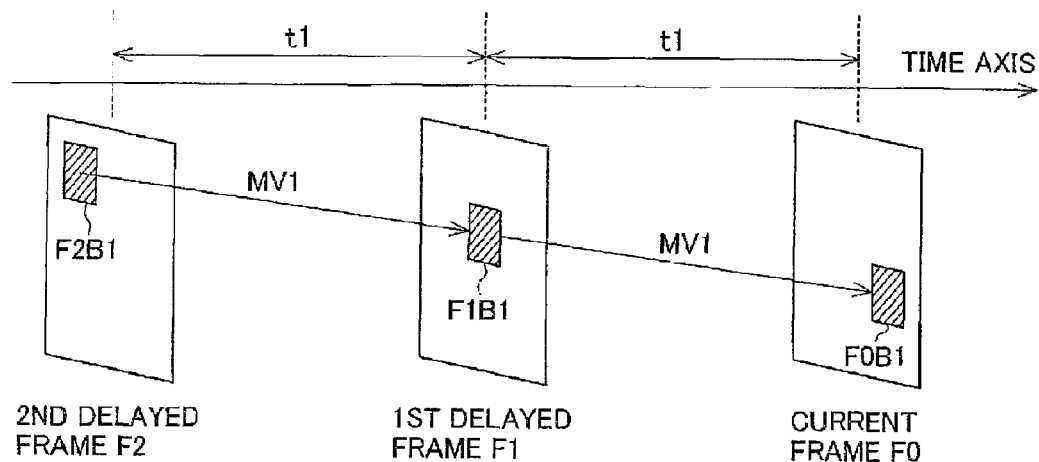
FIGS. 4A and 4B illustrate the operation of the motion vector converter in FIG. 1.

The motion vector converter 3 converts the motion vector MV1 from the first delayed frame F1 to the current frame F0 (FIG. 4A) to the second motion vector MV2 from the first delayed frame F1 to the interpolated frame IF and the third motion vector MV3 from the current frame F0 to the interpolated frame IF (FIG. 4D). In FIG. 4B, the block to be generated using interpolation from the blocks F1B1 and F0B1 are denoted IFB1.

Figure 4B:
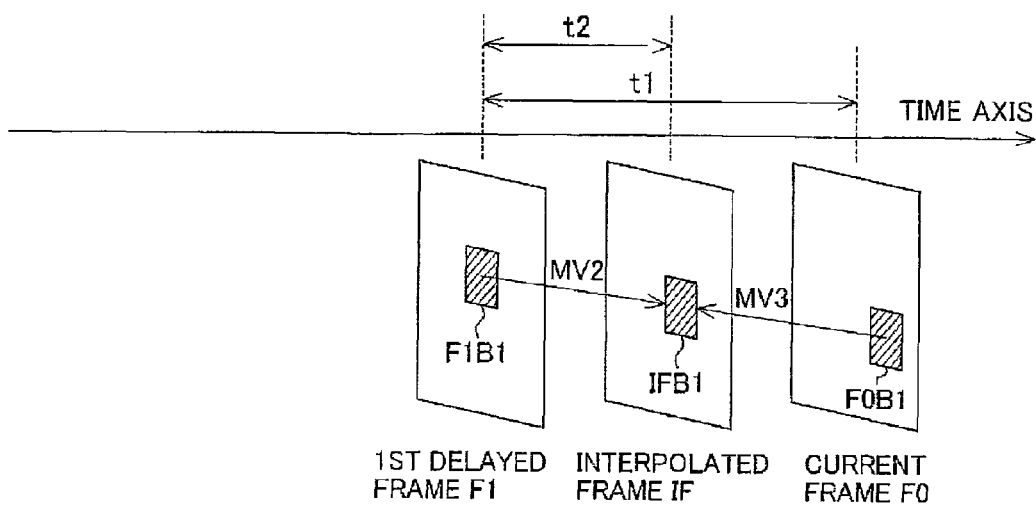

If the time interval between input frames is denoted t1 and the time interval from the first delayed frame F1 to the interpolated frame IF is denoted t2 as shown in FIG. 4B, the motion vectors MV2, MV3 are calculated by the following equations (2A), (2B). When a 60-Hz input image signal is converted to a 120-Hz image signal, for example, t1 is 1/60 seconds and t2 is 1/120 seconds.

$$MV2 = MV1 \times t2/t1 \tag{2A}$$

$$MV3 = -MV1 \times (t1-t2)/t1 \tag{2B}$$

These conversions can be regarded as using a process that apportions the vector MV1 from the first delayed frame F1 to the current frame F0 according to the time intervals (t2, t1−t2) between the first delayed frame F1 and the interpolated frame IF and between the interpolated frame IF and the current frame F0.

Figure 5A:
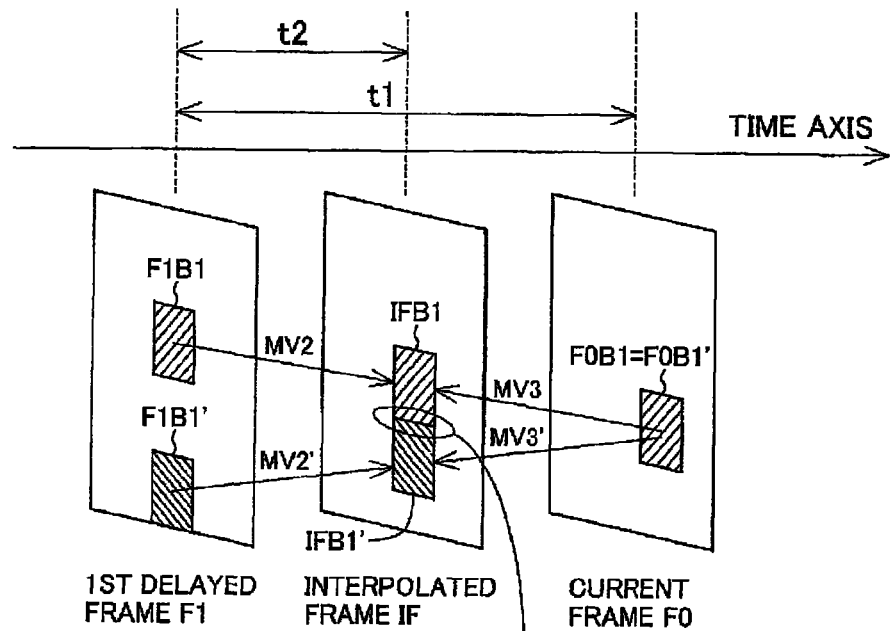
FIGS. 5A, 5B, and 5C illustrate the operation of the occlusion area estimator and interpolated frame generator in FIG. 1.
Figure 5B:
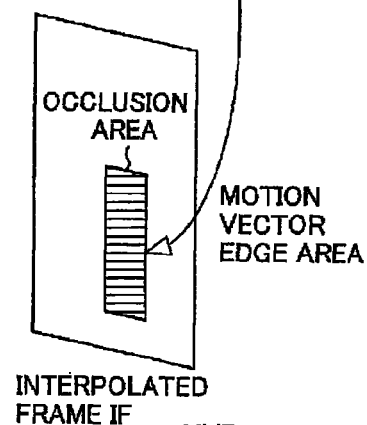
Figure 5C:
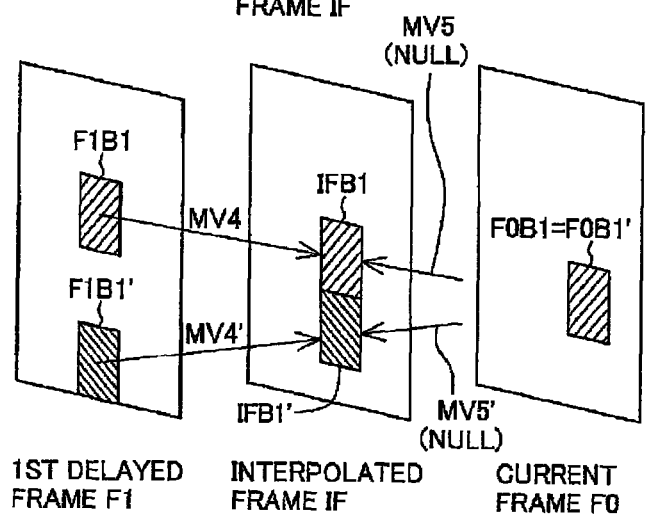

Next, the operation of the occlusion area estimator 4 and the interpolated frame generator 5 will be described in detail with reference to FIGS. 5A to 5C.

The occlusion area estimator 4 detects edges at which the motion vectors MV2, MV3 change sharply in the interpolated frame. At a motion vector edge (a boundary between one area consisting of a contiguous plurality of blocks with small differences between motion vectors and another area consisting of a contiguous plurality of blocks with small differences between motion vectors), an image element appears or disappears in the frames preceding or following the interpolated frame. The occlusion area estimator 4 treats an area including parts peripheral to this edge as an occlusion area OC, as shown in FIG. 5B. The size of the occlusion area OC depends on the magnitude of the motion vectors; the larger the motion vectors are, the larger the occlusion area OC is.

Next, from which frame, the temporally preceding frame or temporally following frame, data is to be taken for use in interpolation in the obtained occlusion area OC is determined.

If the motion vectors in two adjacent areas on opposite sides of the motion vector edge point in mutually approaching directions, an image element will disappear in the future, so that data are taken from the past frame (data from the past frame are used as data of the interpolated frame). That is, motion vector MV2 is output as the fourth vector MV4, and a null vector (a notification that the pixels in the block F0B1 in the current frame F0 corresponding to (i.e., according to) the third vector MV3 do not correspond to (i.e., do not match) the pixels in the block IFB1 in the interpolated frame IF, i.e., there is no block corresponding to the fifth vector MV5) is output as the fifth vector MV5.

The information indicating presence or absence of a motion vector edge, and whether the motion vectors in two adjacent areas on opposite sides of the motion vector edge point in mutually approaching directions serves as information indicating presence of absence of pixels within the current frame F0 corresponding to the third motion vector MV3.

If the motion vectors in two adjacent areas on opposite sides of the motion vector edge point in mutually receding directions, a hidden image element will appear in the future, so that data are taken from the future frame (data of the future frame are used as data of the interpolated frame). That is, a null vector (a notification that the pixels in the block F1B1 in the first delayed frame F1 corresponding to (i.e., according to) the second vector MV2 do not correspond to (i.e., do not match) the pixels in the block IFB1 in the interpolated frame IF, i.e., there is no block corresponding to the fourth vector MV4) is output as the fourth vector MV4, and motion vector MV3 is output as the fifth vector MV5.

The information indicating presence or absence of a motion vector edge, and whether the motion vectors in two adjacent areas on opposite sides of the motion vector edge point in mutually receding direction serves as information indicating presence of absence of pixels within the first delayed frame F1 corresponding to the second motion vector MV2.

In this way, the fourth motion vector MV4 is determined based on the second motion vector MV2 and information indicating presence or absence of pixels (or block) within the first delayed frame F1 corresponding to the second motion vector MV2, and the fifth motion vector MV5 is determined based on the third motion vector MV3 and information indicating presence or absence of pixels (or block) within the current frame F0 corresponding to the third motion vector MV3.

After the fourth and fifth vectors MV4, MV5 are obtained in this way, the data of the interpolated frame IF is determined by calculating averages between the data of the first delayed frame F1 at positions shifted by the vector −MV4 from the interpolated frame (the data in block F1B1) and the data of the current frame F0 at positions shifted by the vector −MV5 from the interpolated frame (the data in block F0B1). The data used for interpolation, in this case block data F1B1 in the first delayed frame F1 and block data F0B1 in the current frame F0, are in mutually symmetric positions centered on the position of the data to be obtained by interpolation in the interpolated frame IF. When one of the fourth and fifth vectors MV4, MV5 is a 'no corresponding block' vector (a null vector), however, the data indicated by the other vector alone are used without further change as data of the interpolated frame IF.

The data of the interpolated frame IF consisting of the generated data in a manner described above are inserted (for interpolation) and output between the data of the first delayed frame F1 and the data of the current frame F0.

Figure 6:
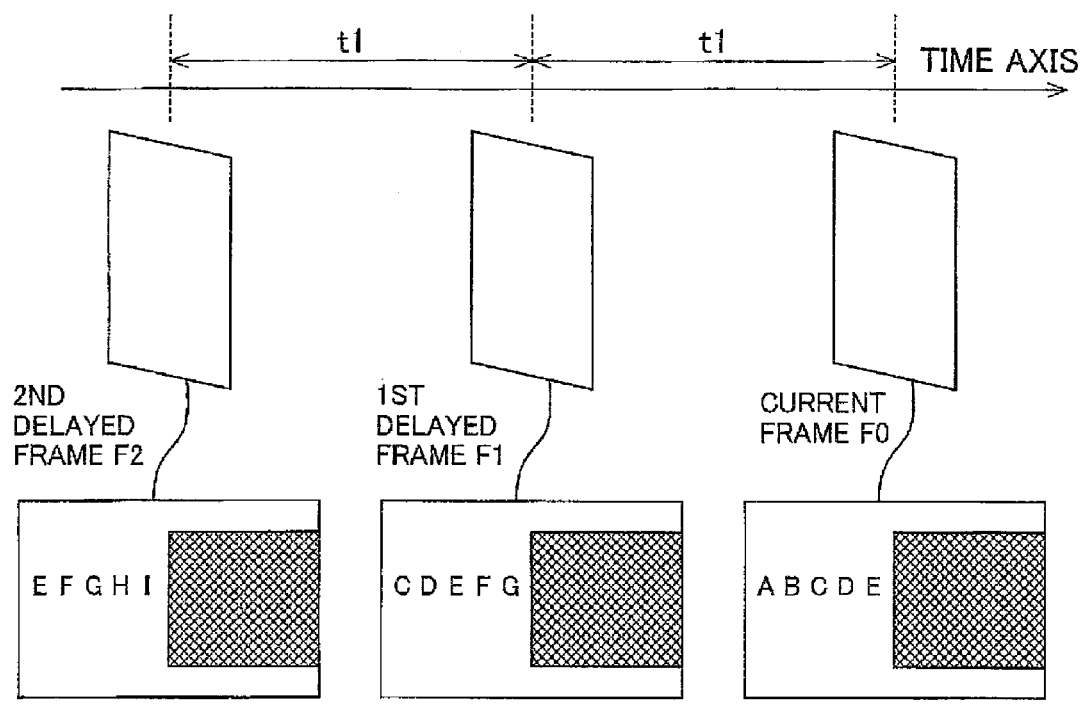
FIG. 6 illustrates the correspondence between the first and second delayed frame data and the image data and current frame data used in the exemplary motion vector detector.

FIG. 6 is a diagram illustrating the correspondence among data of the current frame F0, data of the first delayed frame F1, and data of the second delayed frame F2 which are used in an example of the operation of the motion vector detector 2. The operation of the present embodiment performed when signals representing video images such as the ones shown in FIG. 6 are input will be described. In the video images shown in FIG. 6, letters of the alphabet move as image elements from left to right over time and disappear behind a black square (cross-hatched in the diagram), which is a stationary image element.

Figure 7A:
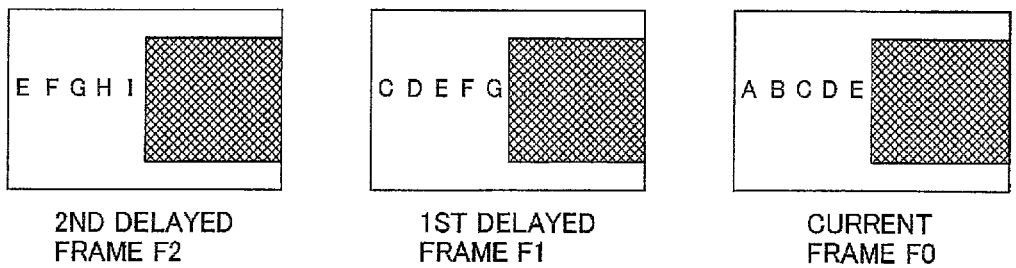
FIGS. 7A to 7D show examples of the operation of the motion vector detector in FIG. 1.
Figure 7B:
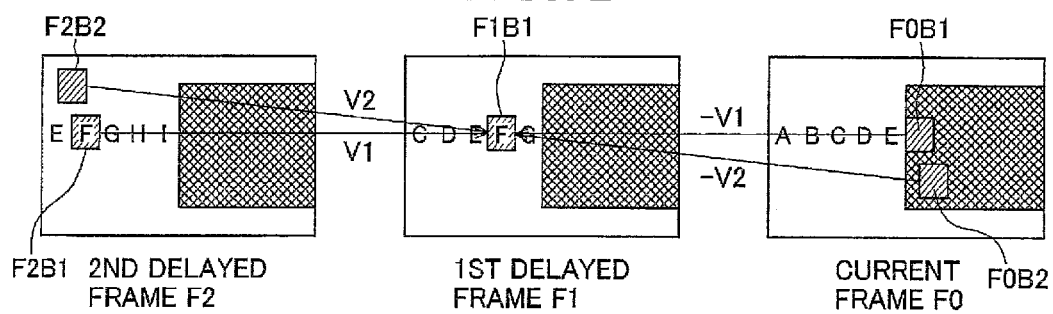
Figure 7C:
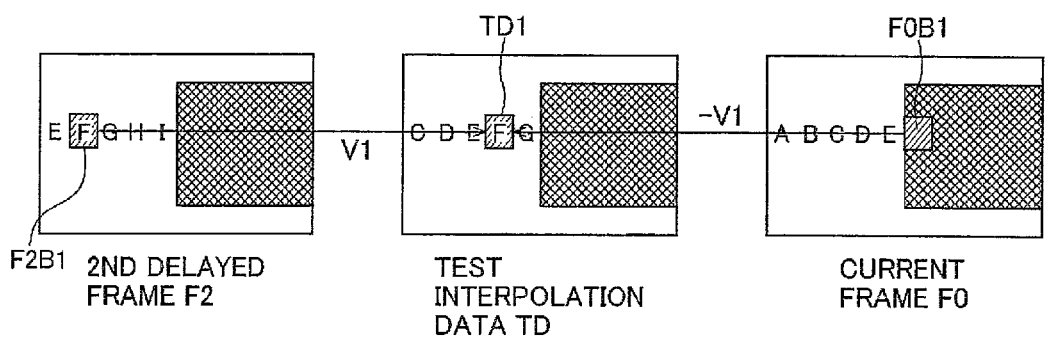
Figure 7D:
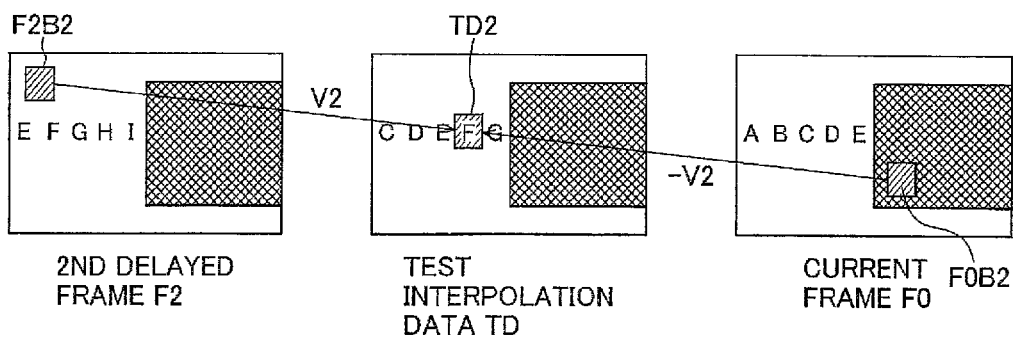

FIGS. 7A to 7D are diagrams showing an example of the operation of the motion vector detector 2: FIG. 7A shows exemplary image data input to the motion vector detector 2; FIGS. 7B to 7D illustrate the operation of the test interpolator 7 and interpolation data evaluator 8.

The operation performed by the motion vector detector 2 when the data of the second delayed frame F2, first delayed frame F1, and current frame F0 shown in FIG. 7A are input will now be described.

The test interpolator 7 generates test interpolation data for each motion vector. As shown in FIG. 7B, a region forming a part of the first delayed frame F1 is set as block data F1B1 in the first delayed frame F1; block data in the second delayed frame F2 at a position shifted by −V1 from the block data F1B1 of the first delayed frame F1 are set as first block data F2B1; block data in the current frame F0 at a position shifted by V1 from the block data F1B1 of the first delayed frame F1 are set as block data F0B1. Further, block data in the second delayed frame F2 at a position shifted by −V2 from the block data F1B1 of the first delayed frame F1 are set as block data F2B2; block data in the current frame F0 at a position shifted by V2 from the block data F1B1 of the first delayed frame F1 are set as block data F0B2.

As shown in FIG. 7C, per-pixel averages are generated from the first block data F2B1 and block data F0B1 as test interpolation data TD1. FIG. 7C shows that the image represented by test interpolation data TD1 includes the letter F. Test interpolation data TD2 are generated similarly, from the second block data F2B2 and block data F0B2 as shown in FIG. 7D.

The interpolation data evaluator 8 calculates the sum of absolute differences between block data F1B1 and each of the test interpolation data TD1 and TD2 shown in FIGS. 7C and 7D and outputs evaluation data ED1 and ED2. In the specific example in FIGS. 7A to 7D, the image represented by test interpolation data TD1, which includes the letter F, has the smallest sum of absolute differences from block data F1B1 and therefore has the smallest evaluation data ED1.

The motion vector determiner 9 outputs the motion vector V1 corresponding to the smallest evaluation data ED1 of the evaluation data ED1 and ED2 as the motion vector of data block F1B1.

By setting blocks on the first delayed frame F1 without leaving gaps and calculating motion vectors, first motion vectors MV1 are generated for all areas on the first delayed frame F1. That is, the first delayed frame F1 is divided into a plurality of, for example, blocks of mutually identical size, and the above process is performed on each of the blocks, thereby generating first motion vectors MV1 for the blocks. By using the first motion vectors and performing a conversion, second and third motion vectors can then be obtained for blocks in the interpolated frame located at positions corresponding to, e.g., identical to, the positions of the blocks in the first delayed frame F1.

Alternatively, the above process may be performed on blocks of a predetermined size centered on each pixel in the first delayed frame, thereby generating a first motion vector MV1 for each pixel, and by using the first motion vectors and performing a conversion, second and third motion vectors can then be obtained for the pixels in the interpolated frame located at the positions corresponding to, e.g., identical to, the positions of the pixels in the first delayed frame.

Figure 8A:
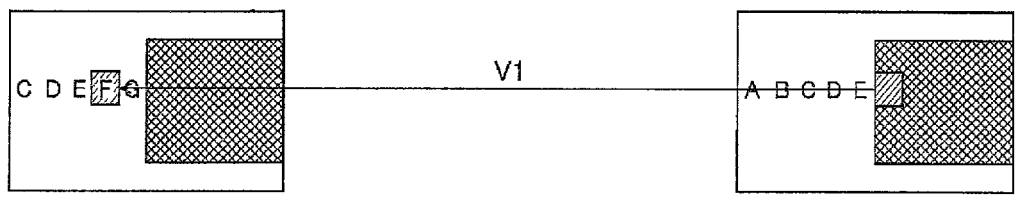
FIGS. 8A and 8B illustrate the operation of the motion vector converter in FIG. 1.
Figure 8B:
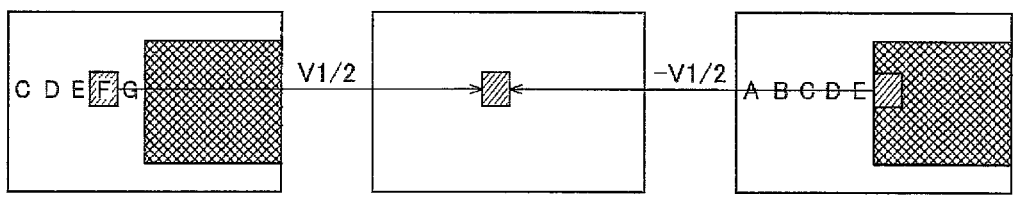

FIGS. 8A and 8B are diagrams showing an example of the operation of the motion vector converter 3: FIG. 8A shows inputs to the motion vector converter 3; FIG. 8B shows outputs from the motion vector converter 3.

Using equations (2A), (2B) and assuming t2=t1/2, the motion vector converter 3 converts the motion vector MV1 from the first delayed frame F1 to the current frame F0, shown in FIG. 8A, into a second motion vector MV2 from the first delayed frame F1 to the interpolated frame IF and a third motion vector MV3 from the current frame F0 to the interpolated frame IF as shown in FIG. 8B. In the example shown in FIGS. 8A and 8B, MV1 equals V1, t1 equals 1/60 seconds, and t2 equals 1/120 seconds, so that from equations (2A) and (2B), MV2 becomes V1/2 and MV3 becomes −V1/2.

Figure 9A:
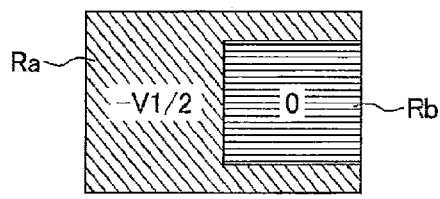
FIGS. 9A to 9C illustrate the operation of the occlusion area estimator in FIG. 1.
Figure 9B:
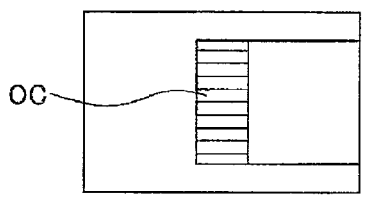
Figure 9C:
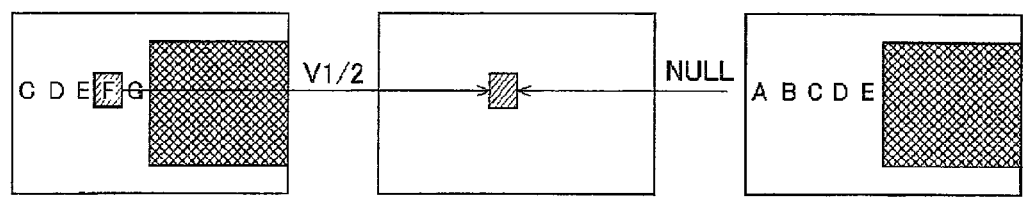

FIGS. 9A to 9C are diagrams showing an example of the operation of the occlusion area estimator 4. FIG. 9A shows the values of third motion vectors MV3 from the current frame F0 to the interpolated frame IF in two areas Ra, Rb in the image. In the example shown in FIG. 9A, the third motion vector MV3 is −V1/2 in area Ra, and zero in area Rb. FIG. 9B shows the estimated occlusion area OC. FIG. 9C shows a fourth motion vector MV4 from the first delayed frame F1 to the interpolated frame IF and a fifth motion vector MV5 from the current frame F0 to the interpolated frame IF.

From the third motion vectors MV3 with the values shown in FIG. 9A, the occlusion area estimator 4 infers a motion vector edge (a boundary between the area Ra in which the motion vector is −V1/2 and the area Rb in which the vector is 0) and treats this edge and its peripheral area as an occlusion area OC, as shown in FIG. 9B. The −V1/2 in the area Ra and the zero motion vector are treated as mutually approaching.

As described above, an edge is detected on the basis of a sharp change in motion vector value. FIG. 9C shows the fourth motion vector MV4 from the first delayed frame F1 to the interpolated frame IF and the fifth motion vector MV5 from the current frame F0 to the interpolated frame IF in the estimated occlusion area OC. That is, the fourth motion vector MV4 equals MV2=−MV3=V1/2, and the fifth motion vector MV5 is a 'no corresponding block' vector (null vector).

Figure 10:
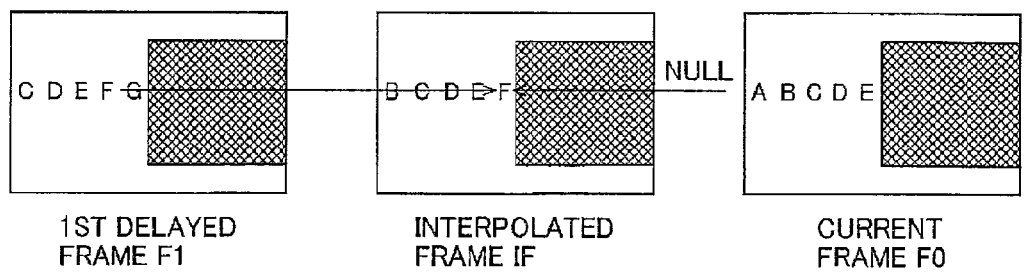
FIG. 10 illustrates the operation of the interpolated frame generator in FIG. 1.

FIG. 10 is a diagram showing an example of the operation of the interpolated frame generator 5. As shown in FIG. 10, the interpolated frame generator 5 calculates, as the data of the interpolated frame IF, the averages of the data of the first delayed frame F1 at positions shifted by −MV4 from the interpolated frame IF and the data of the current frame F0 at positions shifted by −MV5 from the interpolated frame IF. As indicated by the arrows in FIG. 10, however, when one motion vector (MV5) is a 'no corresponding block' vector (null vector), the data corresponding to the other motion vector (MV4) are treated as the data of the interpolated frame IF. The generated interpolated frame IF is inserted (for interpolation) and output between the first delayed frame F1 and the current frame F0.

For comparison, consider what would happen if the occlusion area estimator 4 were omitted. The second and third motion vectors MV2, MV3 would then be input to the interpolated frame generator 5 (instead of the fourth and fifth motion vectors). In the area including the letter F in the interpolated frame IF, an interpolated image would be obtained by taking the average of the black data (cross-hatched in the diagram) of the current frame F0 and the letter F data of the first delayed frame F1, so that the edge would lack clarity and the image quality would be degraded.

The present invention does not perform the averaging process described above. Data in occlusion areas of interpolated frames are determined on the basis of one motion vector, so that edge sharpness is maintained and the interpolated image is not disrupted.

As described above, by evaluating motion vectors, the present embodiment can detect motion vectors accurately, and can determine which of the two frames to be used for interpolation for occlusion areas, and can generate interpolated frames without disrupting the image. Even when an image element appears or disappears between the preceding and following frames, the present embodiment can interpolate a frame without disruption.

Figure 11:
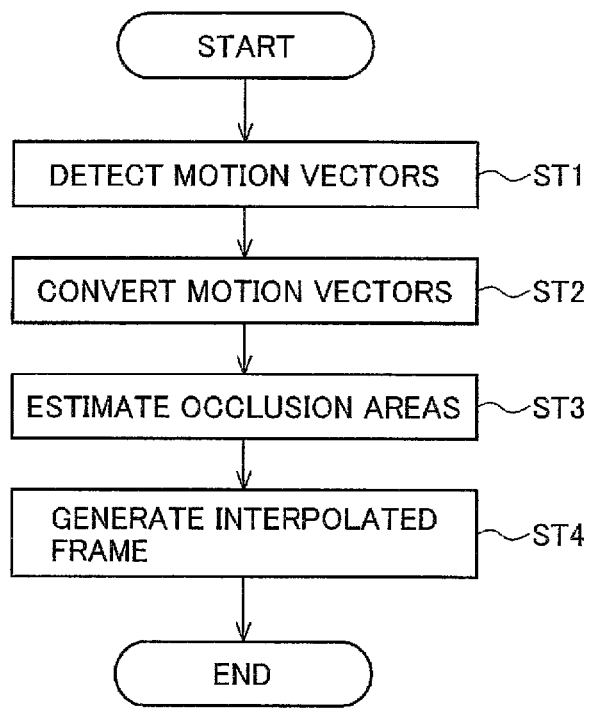
FIG. 11 is a flowchart showing the processing steps of the image display device according to the embodiment.

FIG. 11 is a flowchart showing the processing steps of the above-described image display device according to the present embodiment.

First, in a motion vector detection step ST1, first motion vectors MV1 from the first delayed frame F1 to the current frame F0 are generated on the basis of the image data F0, the image data F1 delayed by one frame from the image data F0, and the image data F2 delayed by two frames from the image data F0. This operation is equivalent to the operation of the motion vector detector 2.

In a motion vector conversion step ST2, the first motion vectors MV1 are converted to second motion vectors MV2 from the first delayed frame F1 to the interpolated frame IF (which is inserted between the current frame F0 and the first delayed frame F1) and third motion vectors MV3 from the current frame F0 to the interpolated frame IF. This operation is equivalent to the operation of the motion vector converter 3.

In an occlusion area estimation step ST3, occlusion areas OC are inferred from the second and third motion vectors MV2, MV3, the fourth and fifth motion vectors MV4, MV5 are generated by modifying the second and third motion vectors MV2, MV3 on the basis of information about the estimated occlusion areas. This operation is equivalent to the operation of the occlusion area estimator 4.

In an interpolated frame generation step ST4, the data of the interpolated frame IF are generated from the data of the first delayed frame F1, the data of the current frame F0, the fourth motion vectors MV4, and the fifth motion vectors MV5, and image data DO are generated in which the data of the generated interpolated frame IF are inserted between the data of the current frame F0 and the data of the first delayed frame F1. This operation is equivalent to the operation of the interpolated frame generator 5.

As will be appreciated from the description with reference to FIG. 11, part of the image display device in FIG. 1, especially, part of or the whole of the motion vector detector 2, the motion vector converter 3, the occlusion area estimator 4, and the interpolated frame generator 5, may be implemented by software, that is, by a programmed computer.

Those skilled in the art will recognize that further variations are possible within the scope of the invention, which is defined in the appended claims.

What is claimed is:

1. An image processing device for inserting a newly interpolated frame between data of a current frame of an image and data of a first delayed frame one frame before the current frame, comprising:
   a motion vector detector for calculating, for each of a plurality of blocks consisting of a plurality of pixels within the first delayed frame, a first motion vector from the first delayed frame to the current frame, on a basis of the data of the current frame, the data of the first delayed frame, and data of a second delayed frame two frames before the current frame;
   a motion vector converter for converting the first motion vector to a second motion vector from the first delayed frame to the interpolated frame and a third motion vector from the current frame to the interpolated frame by apportioning the first motion vector among the second and third motion vectors;
   an occlusion area estimator for detecting occlusion areas in which the interpolated frame lacks pixels corresponding to pixels present in the first delayed frame according to the second motion vector or pixels corresponding to pixels present in the current frame according to the third motion vector, each occlusion area consisting of an area of sharp change between mutually adjacent second motion vectors or mutually adjacent third motion vectors, and an area peripheral to the area of sharp change, and outputting, on a basis of information about the occlusion areas, a fourth motion vector based on information indicating presence or absence of pixels according to the second motion vector and a fifth motion vector based on information indicating presence or absence of pixels according to the third motion vector; and
   an interpolated frame generator for generating data for the interpolated frame from the fourth motion vector, the fifth motion vector, the data of the first delayed frame, and the data of the current frame, and outputting image data in which the data of the interpolated frame are inserted between the data of the current frame and the data of the first delayed frame.

2. The image processing device of claim 1, wherein if the second motion vectors or the third motion vectors of two mutually adjacent blocks differ by a predetermined value or more, the occlusion area estimator infers an edge between these two blocks, and treats the edge and its peripheral area as one of the occlusion areas.

3. The image processing device of claim 2, wherein if the second motion vectors or the third motion vectors in the two blocks on opposite sides of the edge point in mutually approaching directions, the interpolated frame generator generates the data for the one of the occlusion areas in the interpolated frame from the fourth motion vector and the data of the first delayed frame, and if the second motion vectors or the third motion vectors in the two blocks on the opposite sides of the edge point in mutually receding directions, the interpolated frame generator generates the data for the one of the occlusion areas in the interpolated frame from the fifth motion vector and the data of the current frame.

4. The image processing device of claim 1, wherein the motion vector detector includes:
   a test interpolator for generating a plurality of test interpolation data from at least one of the data of the second delayed frame and the data of the current frame,
   an interpolation data evaluator for evaluating strength of correlation of the plurality of test interpolation data on a basis of the data of the first delayed frame and outputting a plurality of evaluation data; and
   a motion vector determiner for generating the first motion vector on a basis of the evaluation data having a strongest correlation among the plurality of evaluation data.

5. The image processing device of claim 4, wherein the test interpolator generates the test interpolation data on a basis of data of a block consisting of a plurality of pixels in the second delayed frame and a block consisting of a plurality of pixels in the current frame that are in point-symmetric positions with respect to a block consisting of a plurality of pixels in the first delayed frame taken as a center of symmetry.

6. The image processing device of claim 4, wherein the interpolation data evaluator calculates, as the correlation, a sum of absolute differences of the data of pixels at mutually corresponding positions in the blocks.

7. The image processing device of claim 4, wherein the test interpolator includes a plurality of test interpolation data generators for determining, as the test interpolation data, block data by calculating averages of the block data in the current frame and the block data in the second delayed frame on a per-pixel basis.

8. The image processing device of claim 7, wherein the interpolation data evaluator includes a plurality of sum-of-absolute-differences calculators for calculating a sum of absolute differences between the test interpolation data output from the test interpolation data generators and the data of the block in the first delayed frame.

9. An image display device comprising:
   the image processing device of claim 1; and
   an image display unit for displaying the image data output from the interpolated frame generator.

10. An image processing method for inserting a newly interpolated frame between data of a current frame of an image and data of a first delayed frame one frame before the current frame, comprising:
    a motion vector detection step for calculating, for each of a plurality of blocks consisting of a plurality of pixels within the first delayed frame, a first motion vector from the first delayed frame to the current frame, on a basis of the data of the current frame, the data of the first delayed frame, and data of a second delayed frame two frames before the current frame;
    a motion vector conversion step for converting the first motion vector to a second motion vector from the first delayed frame to the interpolated frame and a third motion vector from the current frame to the interpolated frame by apportioning the first motion vector among the second and third motion vectors;
    an occlusion area estimation step for detecting occlusion areas in which the interpolated frame lacks pixels corresponding to pixels present in the first delayed frame according to the second motion vector or pixels corresponding to pixels present in the current frame according to the third motion vector, each occlusion area consisting of an area of sharp change between mutually adjacent second motion vectors or mutually adjacent third motion vectors, and an area peripheral to the area of sharp change, and outputting, on a basis of information about the inclusion areas, a fourth motion vector based on information indicating presence or absence of pixels according to the second motion vector and a fifth motion vector based on information indicating presence or absence of pixels according to the third motion vector; and an interpolated frame generation step for generating data for the interpolated frame from the fourth motion vector, the fifth motion vector, the data of the first delayed frame, and the data of the current frame, and outputting image data in which the data of the interpolated frame are inserted between the data of the current frame and the data of the first delayed frame.

11. The image processing method of claim 10, wherein if the second motion vectors or the third motion vectors of two mutually adjacent blocks differ by a predetermined value or more, the occlusion area estimation step infers an edge between these two blocks, and treats the edge and its peripheral area as the occlusion area.

12. The image processing method of claim 11, wherein if the second motion vectors or the third motion vectors in the two blocks on opposite sides of the edge point in mutually approaching directions, the interpolated frame generation step
generates the data for the one of the occlusion areas in the interpolated frame from the fourth motion vector and the data of the first delayed frame, and if the second motion vectors or the third motion vectors in the two blocks on opposite sides of the edge point in mutually receding directions, the interpolated frame generation step generates the data for the one of the occlusion areas in the interpolated frame from the fifth motion vector and the data of the current frame.

13. The image processing method of claim 10, wherein the motion vector detection step includes:

a test interpolation step for generating a plurality of test interpolation data from at least one of the data of the second delayed frame and the data of the current frame, an interpolation data evaluation step for evaluating strength of correlation of the plurality of test interpolation data on a basis of the data of the first delayed frame and outputting a plurality of evaluation data; and a motion vector determination step for generating the first motion vector on a basis of the evaluation data having a strongest correlation among the plurality of evaluation data.

14. The image processing method of claim 13, wherein the test interpolation step generates the test interpolation data on a basis of data of a block consisting of a plurality of pixels in the second delayed frame and a block consisting of a plurality of pixels in the current frame that are in point-symmetric positions with respect to a block consisting of a plurality of pixels in the first delayed frame taken as a center of symmetry.

15. The image processing method of claim 13, wherein the interpolation data evaluation step calculates, as the correlation, a sum of absolute differences of the data of pixels at mutually corresponding positions in the blocks.

16. The image processing method of claim 13, wherein the test interpolation step includes a plurality of test interpolation data generation steps for determining, as the test interpolation data, block data by calculating averages of the block data in the current frame and the block data in the second delayed frame on a per-pixel basis.

17. The image processing method of claim 16, wherein the interpolation data evaluation step includes a plurality of sum-of-absolute-differences calculation steps for calculating a sum of absolute differences between the test interpolation data output from the test interpolation data generation steps and the data of the block in the first delayed frame.

18. An image display method comprising:
the image processing method of claim 10; and
an image display step for displaying the image data output from the interpolated frame generation step.

* * * * *